(12) United States Patent
Miller et al.

(10) Patent No.: US 6,268,046 B1
(45) Date of Patent: Jul. 31, 2001

(54) PROCESS FOR PRODUCING EXTRUDED FOAM PRODUCTS HAVING POLYSTYRENE BLENDS WITH HIGH LEVELS OF $CO_2$ AS A BLOWING AGENT

(75) Inventors: Larry Michael Miller, Suffield; Thomas Earl Cisar, Cuyahoga Falls; Raymond Marshall Breindel, Hartville; Mitchell Zane Weekley, Akron, all of OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/422,412

(22) Filed: Oct. 21, 1999

Related U.S. Application Data

(60) Provisional application No. 60/105,058, filed on Oct. 21, 1998.

(51) Int. Cl.$^7$ .................................. B32B 7/02; C08J 9/00
(52) U.S. Cl. ........................ 428/220; 521/79; 521/81; 521/99; 521/117; 521/133; 521/134; 521/139; 521/146; 524/81; 524/275; 428/305.5; 428/314.8
(58) Field of Search ................................. 521/79.81, 99, 521/117, 113, 134, 139, 146; 524/81, 275; 428/220, 305.5, 314.8

(56) References Cited

U.S. PATENT DOCUMENTS

| | | |
|---|---|---|
| 4,176,144 | 11/1979 | Schwab . |
| 4,636,527 | 1/1987 | Suh et al. . |
| 4,764,420 | 8/1988 | Gluck et al. . |
| 5,082,608 | 1/1992 | Karabedian et al. . |
| 5,110,524 | 5/1992 | Harclerode et al. . |
| 5,110,837 | 5/1992 | Harclerode et al. . |
| 5,218,006 | 6/1993 | Reedy et al. . |
| 5,229,429 | 7/1993 | Hahn et al. . |
| 5,240,657 | 8/1993 | Harclerode et al. . |
| 5,244,927 | 9/1993 | Binder et al. . |
| 5,250,577 | 10/1993 | Welsh . |
| 5,258,415 | 11/1993 | Hahn et al. . |
| 5,269,987 | 12/1993 | Reedy et al. . |
| 5,288,740 | 2/1994 | Park et al. . |
| 5,302,624 | 4/1994 | Reedy et al. . |
| 5,332,761 | 7/1994 | Paquet et al. . |
| 5,342,857 | 8/1994 | Reedy et al. . |
| 5,389,694 | 2/1995 | Vo et al. . |
| 5,422,378 | 6/1995 | Vo . |
| 5,426,125 | 6/1995 | Vo et al. . |
| 5,434,195 | 7/1995 | Imeokparia et al. . |
| 5,453,454 | 9/1995 | Alicke et al. . |
| 5,462,794 | 10/1995 | Lindemann et al. . |

FOREIGN PATENT DOCUMENTS

| | | |
|---|---|---|
| 196 37 366 A1 | 3/1998 | (DE) . |
| 0 291 179 | 11/1988 | (EP) . |
| 0 318 846 B1 | 6/1989 | (EP) . |
| 0 360 030 B1 | 3/1990 | (EP) . |
| 0 361 095 A1 | 4/1990 | (EP) . |
| 0 361 096 A1 | 4/1990 | (EP) . |
| 0 464 581 B1 | 1/1992 | (EP) . |
| 0 543 242 B1 | 5/1993 | (EP) . |
| 0 700 413 B1 | 3/1996 | (EP) . |
| 0 802 220 A2 | 10/1997 | (EP) . |
| WO 86/06084 | 10/1986 | (WO) . |
| WO 96/00258 | 1/1996 | (WO) . |
| WO 96/11970 | 4/1996 | (WO) . |
| WO 96/18672 | 6/1996 | (WO) . |
| WO 96/34038 | 10/1996 | (WO) . |

OTHER PUBLICATIONS

Copending U.S. Application No. 09/154,067.
Copending U.S. Application No. 09/154,288.

*Primary Examiner*—Samuel A. Acquah
(74) *Attorney, Agent, or Firm*—Inger H. Eckert; Stephen W. Barns

(57) ABSTRACT

In one embodiment, the present invention relates to a process for preparing foam board or sheet including the steps of (A) forming a foamable mixture of (1) a major amount of a styrenic polymer having a high melt index, (2) a minor amount of a low melt index styrenic polymer, and (3) a blowing agent containing a major amount of carbon dioxide under a pressure sufficient to prevent prefoaming of the mixture, and (B) foaming the mixture into a region of reduced pressure to form a foam product.

23 Claims, No Drawings

PROCESS FOR PRODUCING EXTRUDED FOAM PRODUCTS HAVING POLYSTYRENE BLENDS WITH HIGH LEVELS OF CO₂ AS A BLOWING AGENT

CROSS-REFERENCE TO RELATED APPLICATIONS

This application is based on provisional application Ser. No. 60/105,058 filed Oct. 21, 1998.

FIELD OF THE INVENTION

The present invention generally relates to processes for preparing extruded foam products and more particularly to a processes for producing such products having polystyrene blends with high levels of carbon dioxide as a blowing agent.

BACKGROUND OF THE INVENTION

Extruded synthetic resinous foams are useful materials for many applications including thermal insulation, decorative purposes, packaging and the like. Thermal insulation is one particularly important application for styrene polymer foams. In this application, it is desirable to maintain the insulating value of the foam for as long as possible. It is also desirable for the foam to have dimensional stability. The desirable characteristics can be achieved, in part, by providing foams having uniform cell size.

For a considerable period of time, styrene polymer foams were extruded using various halo-carbons, such as methyl chloride, ethyl chloride, chlorocarbons, fluorocarbons (including HFCs) and chlorofluorocarbons (CFCs) including dichlorodifluoromethane, fluorohydrocarbons or chlorofluorohydrocarbons (which, as the name implies, contain at least one hydrogen atom and have been referred to as "soft CFCs", "HCFCs" and "HFCs"), as blowing agents. Examples of halo-carbons generally include (CFCs) such as CFC-11 which is chlorotrifluoromethane, CFC-12 which is dichlorodifluoromethane, and CFC-113 which is 1,2,2-trifluoro-1,1,2-tri-chloroethane, soft CFCs, HCFCs and HFCs, such as chlorodifluoromethane (F-22), 1,1-dichloro2,2,2-trifluoroethane (F-123), 1-chloro-1,1-difluoroethane(F-142b), 1,1,1,2-tetrafluoroethane (F-134a), and 1,1-dichloro-1-fluoroethane (F-141b).

Recently, the use of halo-carbons for applications including aerosols, refrigerants, foam-blowing agents and specialty solvents within the electronics and aerospace industries has been terminated by government regulation or is highly undesirable. This is because halo-carbons are believed to destroy the ozone layer in the stratosphere. Attempts have therefore been made to replace halo-carbons with hydrocarbons such as butane or inert gases such as carbon dioxide. However, there are a number of problems associated with using non-halo-carbon blowing agents including low solubility of the blowing agents in styrene polymers, low quality foam production and so on.

The general procedure utilized in the preparation of extruded synthetic resinous foam bodies generally involves the following steps. A resin, such as a polystyrene resin, is heat plastified and one or more fluid blowing agents is incorporated and thoroughly mixed into the plastified resin under conditions which permit thorough mixing of the blowing agent into the plastified resin and prevent foaming of the mixture. The mixture of resin, blowing agent and optional additives is cooled, and the pressure on the mixture is reduced resulting in foaming of the mixture and formation of the desired foam body. In other words, foam bodies are obtained by extruding the cooled plastified mixture of resin, blowing agent and optional additives into a region of lower pressure.

SUMMARY OF THE INVENTION

The present invention relates to polymer foams which are the so-called "extruded foams". The extruded foams have fairly uniform, relatively small average cell size and are thus particularly useful for thermal insulation. The extruded foams also have a relatively low density and thus are even more particularly useful for thermal insulation. Another aspect of the extruded foams is that they possess a high level of dimensional stability. Finally, the extruded foams can be made without blowing agents such as CFCs, HCFCs, HFCs and soft CFCs. These desirable aspects can be achieved while maximizing the amount of blowing agent soluble in the foamable mixtures.

In one embodiment, the present invention relates to a process for preparing a foam product including the steps of (A) forming a foamable mixture of (1) a major amount of a styrenic polymer having a low melt index, (2) a minor amount of a high melt index styrenic polymer, and (3) a blowing agent containing a major amount of carbon dioxide under a pressure sufficient to prevent prefoaming (the undesirable premature foaming of the foam mixtures before it reaches a region of reduced pressure) of the mixture, and (B) foaming the mixture into a region of reduced pressure to form the foam product.

In another embodiment, the present invention relates to a process of preparing a foam product including the steps of (A) forming a foamable mixture of (1) a major amount of a polystyrene having a weight average molecular weight of about 225,000 to about 400,000, (2) a minor amount of a polystyrene having a weight average molecular weight of about 50,000 to about 100,000, and (3) from about 1% to about 16% by weight of the polystyrenes, a blowing agent containing a major amount of carbon dioxide under a pressure sufficient to prevent prefoaming of the mixture, and (B) foaming the mixture into a region of reduced pressure to form a foam product.

In yet another embodiment, the present invention relates to a foam product comprising a major amount of a styrenic polymer having a low melt index, and a minor amount of a high melt index styrenic polymer, wherein the foam cells are free of halogen blowing agents.

DESCRIPTION OF PREFERRED EMBODIMENTS

The foamable mixtures which are extruded and foamed into foam products, such as foam board, foam sheet and other foam structures, in accordance with the inventive process contain two different styrenic polymers and a blowing agent. The foamable mixtures may contain other optional additives. One styrenic polymer has a high melt index and is a polymer of styrene or a copolymer of styrene and at least one copolymerizable monomer. The other styrenic polymer has a low melt index and is a polymer of styrene or a copolymer of styrene and at least one copolymerizable monomer. Neither, either or both of the two styrenic polymers may be further copolymerized with other monomers.

Both the high and low melt index styrenic polymers contain styrene monomers. A styrene monomer is an aromatic compound characterized by the general formula $$Ar-CH=CH_2 \tag{I}$$

wherein Ar represents an aromatic hydrocarbon group of the benzene series.

Both the high and low melt index styrenic polymers may be copolymers containing styrene monomers and copolymerizable monomers. A copolymerizable monomer is any monomer that can be polymerized with styrene monomers to form a styrene copolymer. Generally speaking, the copolymerizable monomer is a monomer containing an ethylenically unsaturated group. In one embodiment, the amount of copolymerizable monomer in the styrene copolymers is from about 0.1% to about 10%, and preferably from about 1% to about 5%.

In a preferred embodiment, the copolymerizable monomer containing an ethylenically unsaturated group is an aromatic compound of Formula II and may be represented by the following formula

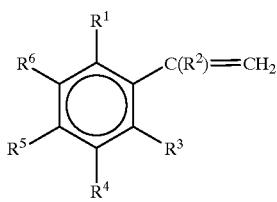

(II)

wherein $R^1$, $R^3$, $R^4$, $R^5$ and $R^6$ are each independently hydrogen, chlorine, bromine, or alkyl groups containing from 1 to about 8 carbon atoms, and $R^2$ is hydrogen or methyl, with the proviso that a total number of carbon atoms in the monomer does not exceed 20. In a preferred embodiment, at least one of $R^4$, $R^5$ and $R^6$ are independently chlorine, bromine, or alkyl groups containing from 1 to about 8 carbon atoms. In another preferred embodiment, at least one of $R^4$, $R^5$ and $R^6$ is an alkyl group containing from 1 to about 4 carbon atoms, such as a methyl group, ethyl group, propyl group, isopropyl group or butyl group. In a more preferred embodiment, one of $R^4$, $R^5$ and $R^6$ is an alkyl group containing from 1 to about 4 carbon atoms and two of $R^4$, $R^5$ and $R^6$ are hydrogen.

Examples of copolymerizable monomers according to Formula (II) include 3-methyl styrene, 4-methyl styrene, 2,4-dimethyl styrene, 2,5-dimethyl styrene, 4-chlorostyrene, 3-chlorostyrene, 4-chloromethyl styrene, 3-chloromethyl styrene, 4-bromostyrene, 3-bromostyrene, alpha-methyl styrene, alpha-2-dimethyl styrene, etc.

In another embodiment, the copolymerizable monomer containing an ethylenically unsaturated group is one or more monomers of acrylonitrile, phenylene ethers, vinyl chloride, vinylidene chloride, olefins such as ethylene, propylene and copolymers thereof, butadiene, maleic anhydride, citraconic anhydride, itaconic anhydride, vinyl acetate, vinyl toluene, and acrylates such as methacrylate, methyl methacrylate, ethyl acrylate, etc.

The foamable mixtures which are extruded and foamed in accordance with the process of the present invention contain a major amount of a styrenic polymer having a low melt index and a minor amount of a styrenic polymer having a high melt index. A major amount means that the foamable mixtures contain at least 50% by weight of a styrenic polymer having a high melt index. A minor amount means that the foamable mixtures contain less than 50% by weight of a styrenic polymer having a low melt index. In one embodiment, foamable mixtures contain from 50 to about 90% by weight of a styrenic polymer having a low melt index and from about 5 to about 40% of a styrenic polymer having a high melt index. In another embodiment, foamable mixtures contain from about 55 to about 85% by weight of a styrenic polymer having a low melt index and from about 7.5 to about 35% of a styrenic polymer having a high melt index. In yet another embodiment, foamable mixtures contain from about 65 to about 80% by weight of a styrenic polymer having a low melt index and from about 10 to about 25% of a styrenic polymer having a high melt index. In one embodiment, the weight ratio of a styrenic polymer having a low melt index to a styrenic polymer having a high melt index is about 95:5 to about 55:45 (by weight). In another embodiment, the weight ratio of a styrenic polymer having a low melt index to a styrenic polymer having a high melt index is about 80:20 to about 60:40.

The flow rate of the melted polymer through an orifice is the melt flow index (MFI) or simply melt index. Determining MFI is a low cost, easily performed technique. Details may be found in a number of publications, such as *Principles of Polymer Chemistry*, by P. J. Flory, Cornell University Press, Ithaca, N.Y., 1953. In one embodiment, styrenic polymers having a high melt index have a melt index from about 10 to about 35. In another embodiment, styrenic polymers having a high melt index have a melt index from about 15 to about 30. In a preferred embodiment, styrenic polymers having a high melt index have a melt index from about 17.5 to about 25. In one embodiment, styrenic polymers having a low melt index have a melt index from about 0.5 to about 5. In another embodiment, styrenic polymers having a low melt index have a melt index from about 0.75 to about 4. In a preferred embodiment, styrenic polymers having a low melt index have a melt index from about 1 to about 3. MFI can be determined, for example, in accordance with ISO 1133:1997(E) ($3^{rd}$ Edition). In one embodiment, the polymers are oil free, especially the high melt index polymer. In another embodiment, the styrenic polymers are free of metal stearates.

The two styrenic polymers generally have different molecular weights. The molecular weights of such polymers can be determined by several methods well known to those skilled in the art, such as intrinsic viscosity, light scattering, and ultracentrifuge sedimentation. In one embodiment, styrenic polymers having a low melt index have weight average molecular weights from about 175,000 to about 500,000. In another embodiment, styrenic polymers having a low melt index have weight average molecular weights from about 200,000 to about 450,000. In yet another embodiment, styrenic polymers having a low melt index have weight average molecular weights from about 225,000 to about 400,000. In a preferred embodiment, styrenic polymers having a low melt index have weight average molecular weights from about 250,000 to about 350,000.

In one embodiment, styrenic polymers having a high melt index have weight average molecular weights from about 30,000 to about 150,000. In a embodiment, styrenic polymers having a high melt index have weight average molecular weights from about 40,000 to about 125,000. In yet another embodiment, styrenic polymers having a high melt index have weight average molecular weights from about 50,000 to about 100,000. In a preferred embodiment, styrenic polymers having a high melt index have weight average molecular weights from about 60,000 to about 90,000.

In one embodiment, the styrenic polymer having a high melt index contains from about 75% to about 100% of styrene monomers. In another embodiment, the styrenic polymer having a high melt index contains from about 80% to about 99% of styrene monomers. In yet another embodiment, the styrenic polymer having a high melt index contains from about 85% to about 95% of styrene monomers.

In one embodiment, the styrenic polymer having a low melt index contains from about 75% to about 100% of styrene monomers. In another embodiment, the styrenic polymer having a low melt index contains from about 80% to about 99% of styrene monomers. In yet another embodiment, the styrenic polymer having a low melt index contains from about 85% to about 95% of styrene monomers.

Useful styrene resins (also referred to herein as polystyrenes) and copolymerizable monomer resins are available commercially from a variety of sources and the resins are available with different properties such as melt flow index, molecular weight and so on. For example, polystyrenes are available from ARCO Chemical Company under the general designation "DYLENE", for example DYLENE D-8; from Polysar Ltd., Sarnia, Ontario; and from Chevron Chemical Co., for example EB-3100.

In one embodiment, the melt index of the styrenic polymers and the properties of the extruded, expanded foamed products obtained by the process of the present invention can be controlled and modified by the selection of the molecular weight of the resins. For example, the preparation of higher density foam polystyrene bodies is facilitated by decreasing the melt index of a styrenic polymer by using higher molecular weight resins whereas the preparation of lower density foam bodies is facilitated by increasing the melt index of a styrenic polymer by using of lower molecular weight or lower viscosity resins.

In one embodiment, the melt index of the styrenic polymers and the properties of the extruded, expanded foamed products obtained by the process of the present invention can be controlled and modified by the relative amount of additional optional monomers used. In this connection, the styrenic polymers may further contain one or more monomers. In another embodiment, the styrenic polymers further contain one or more monomers so long as the polymer has a desirable melt flow index (such as either of those described above).

The blowing agent utilized in the foamable mixtures contains a major amount of carbon dioxide. In one embodiment, the amount of the blowing agent added to the foamable mixture is from about 1% to about 16% by weight based on the weight of the styrenic polymer. In another embodiment, the amount of the blowing agent added to the foamable mixture is from about 2% to about 15% by weight based on the weight of the styrenic polymer. In yet another embodiment, the amount of the blowing agent added to the foamable mixture is from about 3% to about 10% by weight based on the weight of the styrenic polymer. In still yet another embodiment, the amount of the blowing agent added to the foamable mixture is from about 4% to about 8% by weight based on the weight of the styrenic polymer. Variations in the amount of blowing agent incorporated into the foamable mixture may be utilized, depending in part on the components of the blowing agent mixtures, to prepare extruded foamed bodies having different desirable characteristics.

A major amount of carbon dioxide means that the blowing agent contains more than 50% by weight carbon dioxide. In one embodiment, the blowing agent contains more than about 60% carbon dioxide, and particularly from about 65% to about 100% of carbon dioxide. In another embodiment, the blowing agent contains from about 70% to about 90% of carbon dioxide. In yet another embodiment, the blowing agent may be about 100% of carbon dioxide.

The blowing agent may be a mixture of carbon dioxide and at least one lower alcohol. A lower alcohol is an alkyl alcohol containing from 1 to about 4 carbon atoms. Lower alcohols include methanol, ethanol, propanol, isopropanol and butanol. The above carbon dioxide and blowing agent mixtures may also be used with additional, optional and supplemental blowing agents, most notably air, nitrogen and water as described below.

Particularly useful mixtures of blowing agents include mixtures comprising: 51–90% of carbon dioxide and 10–49% of ethanol; 60–80% of carbon dioxide and 20–40of ethanol; 51–90% of carbon dioxide and 10–49% of methanol; 60–80% of carbon dioxide and 20–40% of methanol; 51–90% of carbon dioxide and 10–49% of water; and 60–80% of carbon dioxide and 20–40% of water. The optional use of a lower alcohol in combination with carbon dioxide provides extruded expanded foam products or bodies having larger cell sizes (from about 1% to about 25% larger in size) when compared to similar density bodies produced with carbon dioxide without a lower alcohol. Additionally, the blowing agent blends including carbon dioxide may contribute to extruded expanded foam bodies having improved compressive strengths at comparable densities. Extruded expanded polystyrene bodies of acceptable characteristics are obtained utilizing the above blowing agent and blowing agent mixtures, and there is no necessity to use halo-carbon blowing agents.

In a preferred embodiment, the blowing agent is free of halogen blowing agents. Halogen blowing agents include chlorofluorocarbons, fluorocarbons, soft chlorofluorocarbons, fluorohydrocarbons, and chlorofluorohydrocarbons (typically of methane and ethane). Specific examples of halogen blowing agents include methylchloride, ethylchloride, chlorotrifluoromethane, dichlorodifluoromethane, 1,2,2-trifluoro-1,1,2-trichloroethane, chlorodifluoromethane, 1,1-dichloro-2,2,2-trifluoroethane, 1-chloro-1,1-difluoroethane, 1,1,1,2-tetrafluoroethane and 1,1-di-chloro-1-fluoroethane among others. Since halogen blowing agents can be harmful to the environment, their use is not desirable.

The blowing agent including blowing agent mixtures utilized in the process may be added to the foamable mixtures in any conventional manner. The blowing agent can be incorporated into the foamable mixture (combined with the two styrenic polymers) before, during or after polymerization. In one embodiment, the blowing agent may be directly injected into the foamable mixture in a heat plastifying and mixing apparatus such as an extruder. When more than one blowing agent is to be utilized, each of the blowing agents may be separately injected into the heat plastifying and mixing apparatus.

In addition to the copolymer and blowing agent, the foamable mixtures may contain, and generally do contain other additives which are included to modify certain characteristics and or properties of the foamable mixtures or the resultant foam bodies. For example, nucleating agents may be included to further reduce the primary cell size. Suitable nucleating agents include talc, calcium silicate, calcium carbonate, clays silica, titanium oxide, barium sulfate, diatomaceous earth, indigo, etc. In one embodiment, from about 0.01 to about 1 part of nucleating agent per 100 parts of the styrenic polymer is incorporated into the foamable mixture. In a preferred embodiment, from about 0.05 to about 0.5 parts of nucleating agent per 100 parts of the styrenic polymer are incorporated into the foamable mixture.

Plasticizers may also be added to the foamable mixture to facilitate processing of the foamable mixture in an extruder.

In one embodiment, the plasticizer is a low molecular weight resin (weight average molecular weight below about 20,000). In another embodiment, the plasticizer is a low molecular weight resin having a weight average molecular weight below about 15,000. In a preferred embodiment, the plasticizer is a low molecular weight resin having a weight average molecular weight below about 10,000. Examples of plasticizers include liquid paraffin or white oil, hydrogenated coconut oil, esters of $C_{4-C20}$ monoalcohols, diols glycerine with higher fatty acids, styrene resin, vinyl toluene resin, alpha-methylstyrene resin, lower alcohols (containing 1 to about 4 carbon atoms), etc. In one embodiment, from about 0.1 to about 20 parts of plasticizer per 100 parts of the styrenic polymer is incorporated into the foamable mixture. In a preferred embodiment, from about 1 to about 15 parts of plasticizer per 100 parts of the styrenic polymer are incorporated into the foamable mixture.

Elastomeric rubbers may also be added to the foamable mixture to facilitate processing of the foamable mixture in an extruder and to enhance relaxation of the resultant foam bodies. In a preferred embodiment, the elastomeric rubber is a soluble in a styrenic polymer. In one embodiment, the elastomers are copolymers of styrene and a diene, such as butadiene or isoprene. The copolymers are typically block copolymers such as diblock, triblock or radial block copolymers. Examples of elastomeric rubbers include styrenic rubber, Kraton® (styrene-ethylene/butylene-styrene block copolymer elastomers), styrene-butadiene copolymer rubbers, acrylonitrile-butadiene-styrene copolymer rubbers, etc. A useful elastomer is Finaclear® elastomer which is a blend of a SBS copolymer in polystyrene. This elastomer is available commercially from Fina Chemicals. In one embodiment, from about 0.1 to about 10 parts of elastomeric rubber per 100 parts of the styrenic polymer is incorporated into the foamable mixture. In a preferred embodiment, from about 0.5 to about 5 parts of elastomeric rubber per 100 parts of the styrenic polymer are incorporated into the foamable mixture.

Flame-retardant chemicals may also be added to the foamable mixture to impart flame retardant characteristics to the resulting foamed bodies. Flame-retardant chemicals include brominated aliphatic compounds such as hexabromocyclododecane and pentabromocyclohexane, brominated phenyl ethers, esters of tatrabromophthalic acid, and combinations thereof In one embodiment, from about 0.1 to about 5 parts of flame-retardant chemicals per 100 parts of the styrenic polymer is incorporated into the foamable mixture. In another embodiment, from about 0.5 to about 3 parts of flame-retardant chemicals per 100 parts of the styrenic polymer are incorporated into the foamable mixture.

Other useful additives include stabilizers, pigments, extrusion aids, antioxidants, fillers, antistatic agents, UV absorbers, etc. In one embodiment, the foamable mixture includes a wax, such as a polyethylene wax. The wax is present in an amount from about 0.01 to about 1 or from about 0.03 to about 0.5, or from about 0.04 to about 0.15 parts of wax for every 100 parts of polystyrene. An example of a useful wax is Polywax 3000 available from Baker Petrolite. These other additives can be included at any amount to obtain the desired characteristics in the foamable mixtures or resultant foamed bodies. The optional additives can be incorporated into the foamable mixture (combined with the two styrenic polymers and blowing agent) before, during or after polymerization.

Generally speaking, the components of the foamable mixture are combined and mixed, followed and/or accompanied by heating to a first temperature under a first pressure to form a plastified foamable mixture. From the extruder, the plastified foamable mixture is cooled to a second temperature (generally referred to as die melt temperature) and extruded into a region of reduced pressure to form a foam product. The second temperature is lower than the first temperature. However, any process for making foams from the foamable mixtures according to the invention may be employed.

The first temperature must be sufficient to plastify or melt the mixture. In one embodiment, the first temperature is from about 135° C. (275° F.) to about 240° C. (464° F.) (below about 240° C.). In another embodiment, the first temperature is from about 145° C. (293° F.) to about 210° C. (410° F.) (below about 210° C. 410° F.)). In a preferred embodiment, the first temperature is from about 150° C. (302° F.) to about 165° C. (329° F.) (below about 165° C. (329° F.)). In one embodiment, the second temperature or die melt temperature is from about 140° C. (284° F.) to about 105° C. (221° F.) (below about 140° C. (284° F.)). In another embodiment, the second temperature or die melt temperature is from about 130° C. (266° F.) to about 110° C. (230° F.) (below about 130° C. (266° F.)). In a preferred embodiment, the second temperature or die melt temperature is from about 125° C. (257° F.) to about 115° C. (239° F.) (below about 125° C. (257° F.)).

The first pressure must be sufficient to prevent the foamable mixture containing the blowing agent from prefoaming. Prefoaming involves the undesirable premature foaming of the foamable mixture before it reaches the region of reduced pressure (foaming of the foamable mixture before foaming is desired). Accordingly, the first pressure varies depending upon the identity and amount of blowing agent in the foamable mixture. In one embodiment, the first pressure is from about 700 pounds per square inch absolute (psia) to about 4500 psia. In another embodiment, the first pressure is from about 840 psia to about 4000 psia. In a preferred embodiment, the first pressure is from about 1150 psia to about 3500 psia. The second pressure is sufficient to induce conversion of the foamable mixture into a foam body. In one embodiment, the second pressure is from about 0 psia to about 28 psia. In another embodiment, the second pressure is from about 1.4 psia to about 21 psia. In a preferred embodiment, the second pressure is from about 2.8 psia to about 15 psia.

The foam bodies (foam products including foam boards, foam sheets, foam insulation and other foam structures) prepared in accordance with the invention are characterized generally as having the following characteristics.

The resultant foam bodies generally have a relatively low density, typically less than about 1.361 kg/m$^3$ (3 lbs/ft$^3$). Density can be determined, for example, in accordance with ASTM D1622-88. In one embodiment, the foam bodies have a density from about 0.0454 to about 1.361 kg/m$^3$ (0.1 to about 3 lbs/ft$^3$). In another embodiment, the foam bodies have a density from about 0.2268 to about 1.247 kg/m$^3$ (0.5 to about 2.75 lbs/ft$^3$). In a preferred embodiment, the foam bodies have a density from about 0.4536 to about 1.179 kg/m$^3$. (1 to about 2.6 lbs/ft$^3$). In a more preferred embodiment, the foam bodies have a density from about 0.5897 to about 1.134 kg/m$^3$ (1.3 to about 2.5 lbs/ft$^3$).

The resultant foam bodies generally have a relatively small average cell size, typically less than about 0.4 mm. Average cell size can be determined, for example, according to ASTM D3576-77. In one embodiment, the foam bodies have an average cell size from about 0.01 to about 0.4 mm. In another embodiment, the foam bodies have an average cell size from about 0.05 to about 0.35 mm. In a preferred embodiment, the foam bodies have an average cell size from about 0.1 to about 0.325 mm. In a more preferred embodiment, the foam bodies have an average cell size from about 0.15 to about 0.25 mm.

The resultant foam bodies generally have a relatively uniform average cell size, typically more than about 50% of the cells have a size within about 0.06 mm of the average cell size. In one embodiment, more than about 60% of the cells have a size within about 0.06 mm of the average cell size. In another embodiment, more than about 50% of the cells have a size within about 0.05 mm of the average cell size. In yet another embodiment, more than about 50% of the cells have a size within about 0.045 mm of the average cell size.

In another embodiment, the cell of the foam have a specific orientation. The cell's orientation is determined by comparing the ratio of the diameters of the cells in the X (or extrusion) direction with those in the Z (or thickness) direction. The ratio of the diameter of in the X to Z directions (X:Z) is from about 0.7 mm to about 1.2 mm, or from about 0.75 mm to about 1.1 mm, or from about 0.8 mm to about 1 mm.

The resultant foam bodies generally contain a major amount of closed cells and a minor amount of open cells. The relative amount of closed cells can be determined, for example, according to ASTM D2856-A. In one embodiment, more than about 70% of the cells of the resultant foam bodies are closed cells. In another embodiment, more than about 80% of the cells of the resultant foam bodies are closed cells. In a preferred embodiment, more than about 90% of the cells of the resultant foam bodies are closed cells. In a more preferred embodiment, more than about 95% of the cells of the resultant foam bodies are closed cells.

In one embodiment, the resultant foam bodies made in accordance with the present invention have dimensional stability in any direction of about 5% or less. In another embodiment, the resultant foam bodies made in accordance with the present invention have dimensional stability in any direction of about 4% or less. In a preferred embodiment, the resultant foam bodies made in accordance with the present invention have dimensional stability in any direction of about 3% or less. In a more preferred embodiment, the resultant foam bodies made in accordance with the present invention have dimensional stability in any direction of about 2% or less.

The following example illustrates the process of the present invention and the foam bodies obtained thereby. The general procedure and the apparatus utilized in the following examples, unless otherwise indicated, is as follows. A plastified resin mixture of styrene copolymer, nucleating agent and flame-retardant is prepared, and a blowing agent is incorporated into the plastified resin mixture to form a foamable mixture. In a preferred embodiment, a nucleation agent and a fire-retardant material are incorporated into the foamable mixture.

The foamed boards which are recovered in accordance with the process of the present invention are evaluated for density, average cell size, compressive strength, etc., by techniques known in the art. The average cell size is an average of the cell sizes as determined in the X, Y and Z directions. The "X" direction is the direction of extrusion; the "Y" direction is the cross machine direction; and the "Z" direction is the thickness. The compressive strength of the foam bodies of the present invention are determined utilizing ASTM Test C165-83 entitled "Measuring Compressive Properties of Thermal Insulation".

EXAMPLE

A blend of 80 wt % of a styrene resin (melt index=2), 20 wt % of a styrene resin (melt index=18 and oil-free), 0.08% Finaclear® elastomer, 0.4% of talc, 0.08% polyethylene wax, and 0.8% colorant are fed to a twin screw extruder having a screw diameter of 132 mm. The solids are melted, then mixed with 4.5 wt % carbon dioxide and 1.5 wt % ethanol. The mixture is then cooled to 116° C. (240.8° F.) for foaming to occur and foamed through a die opening of 27 cm wide and 1.2 mm high. The resulting foam has a density of 1.270 kg/m$^3$ (2.8 lbs/ft$^3$), an average cell size of 0.175 mm, an orientation ratio of X to Z of 0.8:1, and a thickness of 3.937 cm (1.55 in).

As is apparent from the above description and examples, the process of the present invention for preparing foamed polystyrene bodies such as boards and billets utilizing a blowing agent comprising carbon dioxide and, optionally, lower alcohols, air, water or mixtures thereof, results in foamed bodies having acceptable and, in some instances, improved characteristics when the foamable mixture is extruded into a region of subatmospheric pressure.

One advantage associated with the foamable mixtures of the present invention is that the components (and the amount of each component) leads to the ability to maximize the amount of carbon dioxide in the foamable mixture. While not wishing to be to bound by any theory, it is believed that the amount of carbon dioxide in the foamable mixture is maximized because the solubility of carbon dioxide in the styrenic polymer having a high melt index is relatively high.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A process for preparing a foam product comprising the steps of
    (A) forming a foamable mixture of (1) a major amount of a styrenic polymer having a low melt index, (2) a minor amount of a high melt index styrenic polymer having a melt index from about 10 to about 35, and (3) a blowing agent comprising a major amount of carbon dioxide under a pressure sufficient to prevent prefoaming of the mixture, and
    (B) foaming the mixture into a region of reduced pressure to form the foam product.

2. The process of claim 1 wherein the styrenic polymers (1) and (2) are each independently polystyrene or a copolymer of styrene and a copolymerizable monomer.

3. The process of claim 1 wherein the high melt index styrenic polymer has a melt index from about 15 to about 30.

4. The process of claim 1 wherein the low melt index styrenic polymer has a melt index from about 0.5 to about 5.

5. The process of claim 1 wherein the high melt index styrenic polymer has a weight average molecular weight from about 30,000 to about 150,000.

6. The process of claim 1 wherein the low melt index styrenic resin has a weight average molecular weight from about 175,000 to about 500,000.

7. The process of claim 1 wherein the low melt index polystyrene is present in an amount from about 55 to about 95 parts and the high melt index styrenic polymer is present in an amount of about 5 parts to about 45 parts, based on the styrenic polymers.

8. The process of claim 1 wherein the foamable mixture further comprises a plasticizer resin having a weight average molecular weight of less than about 20,000.

9. The process of claim 8 wherein the plasticizer is a polymer resin derived from styrene, vinyl toluene or alpha methylstyrene.

10. The process of claim 1 wherein the blowing agent further comprises a lower alcohol.

11. The process of claim 1 wherein the blowing agent further comprises ethanol.

12. The process of claim 1 wherein the foamable mixture further comprises an elastomeric rubber.

13. The process of claim 12 wherein the elastomeric rubber is a styrenic rubber.

14. The process of claim 1 wherein the foamable mixture further comprises a wax.

15. The process of claim 1 wherein the foaming temperature is less than 140° C.

16. A process of preparing a foam product comprising the steps of
   (A) forming a foamable mixture of (1) a major amount of a polystyrene having a weight average molecular weight of about 225,000 to about 400,000, (2) a minor amount of a polystyrene having a weight average molecular weight of about 50,000 to about 100,000, and (3) from about 1% to about 16% by weight of the polystyrenes, a blowing agent comprising a major amount of carbon dioxide under a pressure sufficient to prevent prefoaming of the mixture, and
   (B) foaming the mixture into a region of reduced pressure to form the foam product.

17. The process of claim 16 wherein the foamable mixture further comprises a plasticizer resin having a weight average molecular weight of less than about 20,000.

18. The process of claim 16 wherein the blowing agent further comprises a lower alcohol.

19. The process of claim 16 wherein the foamable mixture further comprises an elastomeric rubber.

20. The process of claim 16 wherein the foamable mixture further comprises a wax.

21. A foam product comprising a major amount of a styrenic polymer having a low melt index, and a minor amount of a high melt index styrenic polymer having a melt index from about 10 to about 35, wherein the foam cells are free of halogen blowing agents.

22. The foam product of claim 21 wherein the foam has a density less than 3 pounds per cubic foot.

23. The foam product of claim 19 wherein the average size is less than 0.4 millimeters.

* * * * *